United States Patent
Yang, Jr.

(10) Patent No.: US 7,161,747 B2
(45) Date of Patent: Jan. 9, 2007

(54) ONE PIECE CLEAR PLASTIC CARDHOLDER, CARDHOLDER SHAPED FRESNEL MAGNIFYING LENS AND METHOD OF MAKING THE SAME

(76) Inventor: Peter S. Yang, Jr., 379 Canal St. South, S. Bound Brook, NJ (US) 08880

( * ) Notice: Subject to any disclaimer, the term of this patent is extended or adjusted under 35 U.S.C. 154(b) by 0 days.

(21) Appl. No.: 10/774,434

(22) Filed: Feb. 10, 2004

(65) Prior Publication Data
US 2005/0174656 A1    Aug. 11, 2005

(51) Int. Cl.
 G02B 7/02 (2006.01)
 G02B 27/02 (2006.01)
 G02B 3/08 (2006.01)

(52) U.S. Cl. .................. 359/812; 359/742; 359/802

(58) Field of Classification Search .......... 359/812, 359/798, 807–8, 802–4, 742, 796, 741; 235/487; 150/147–49; D16/134–36
See application file for complete search history.

(56) References Cited

U.S. PATENT DOCUMENTS

| | | | |
|---|---|---|---|
| 3,140,883 A | 7/1964 | Anthony | 281/34 |
| 3,409,347 A | 11/1968 | Vogel | 359/808 |
| 3,797,917 A | 3/1974 | Barbour | 359/742 |
| 4,044,889 A | 8/1977 | Orentreich et al. | 206/459.5 |
| 4,805,680 A | 2/1989 | Ueno | 150/147 |
| 5,090,561 A * | 2/1992 | Spector | 206/308.1 |
| 5,412,199 A | 5/1995 | Finkelstein et al. | 235/487 |
| 5,434,405 A | 7/1995 | Finkelstein et al. | 235/487 |
| 5,467,871 A * | 11/1995 | DeField | 206/232 |
| 5,471,347 A | 11/1995 | Galiani | 359/807 |
| 5,608,203 A | 3/1997 | Finkelstein et al. | 235/487 |
| 5,610,770 A * | 3/1997 | Galiani | 359/807 |
| 5,941,382 A * | 8/1999 | Fantone et al. | 206/308.1 |
| 5,986,823 A | 11/1999 | Yang, Jr. | 359/742 |
| 5,999,336 A | 12/1999 | Yang, Jr. | 359/742 |
| 6,176,430 B1 * | 1/2001 | Finkelstein et al. | 235/487 |
| 6,412,627 B1 * | 7/2002 | Tiscione et al. | 206/39.4 |
| 6,851,556 B1 * | 2/2005 | Valdez et al. | 206/449 |
| 2005/0117229 A1 * | 6/2005 | Block | 359/802 |

* cited by examiner

Primary Examiner—Jordan Schwartz
Assistant Examiner—Jessica Stultz
(74) Attorney, Agent, or Firm—Antonelli, Terry, Stout and Kraus, LLP.

(57) ABSTRACT

Disclosed is a cardholder with dimensions approximating a standardized card carried by a person, the cardholder being made of a one-piece clear plastic material and may contain a viewing portion having fresnel contour lines and at least a pair of folded edges which form at least a pair of tracks of the cardholder for slipping on and off a standardized card such as credit and debit cards and the like. A method of making the cardholder including a cardholder shaped magnetic lens is also disclosed.

10 Claims, 4 Drawing Sheets

FIG. 6A

Providing clear plastic sheet with Fresnel magnifying window

⇩

Modify plastic sheet to shape of standard card and with tab extensions

⇩

Forming pair of parallel folded edges to form tracks

FIG. 6B

Providing clear plastic sheet with Fresnel magnifying window

⇩

Modify plastic sheet to shape of standard card and with tab extensions

⇩

Coating one side of cut plastic sheet (except window) to provide opaque finish

⇩

Forming pair of parallel folded edges to form tracks

FIG. 6C

Providing clear plastic sheet with Fresnel magnifying window

⇩

Coating one side of plastic sheet (except window) to provide opaque finish

⇩

Modify plastic sheet to shape of standard card and with tab extensions

⇩

Forming pair of parallel folded edges to form tracks

ONE PIECE CLEAR PLASTIC CARDHOLDER, CARDHOLDER SHAPED FRESNEL MAGNIFYING LENS AND METHOD OF MAKING THE SAME

BACKGROUND OF THE INVENTION

1. Field of the Invention

This invention relates to a cardholder of a pocket sized card and to a technique for a fresnel magnifying lens that is pocket sized so as to be within easy reach by a person and is shaped as a cardholder for carrying a standardized card.

2. Description of the Prior Art

Pocket sized magnifiers and, particularly, fresnel lens magnifiers have been incorporated into various objects. For example, U.S. Pat. Nos. 5,412,199 and 5,434,405, both issued in 1995, and U.S. Pat. No. 5,608,203, issued in 1997, which were granted to A. Finkelstein et al, feature a technique incorporating a fresnel magnifier into a machine readable, financial card. This card is capable of accommodating encoded data and graphics as required by financial institutions. The fresnel magnifying window serves as a visual aid to help its users to check the accuracy of the printed receipts such as at points of sale.

There are other known/conventional schemes involving a fresnel magnifier. For example, in 1977, U.S. Pat. No. 4,044,889 was granted to Orentreich et al for a fresnel magnifier that is incorporated into a part of a lipstick cap and a cosmetic container top to magnify the small print on a separate part of the container. In 1974, U.S. Pat. No. 3,797,917 was granted to R. Barbour for a box and viewer assembly for viewing slides with a fresnel magnifier. In 1964, U.S. Pat. No. 3,140,883 was granted to R. L. Anthony for a book cover with a fresnel magnifier. In 1968, U.S. Pat. No. 3,409,347 was granted to R. Vogel for a pocket fresnel magnifier in a transparent case with an opaque liner for accepting advertising messages. Additionally, in 1989, U.S. Pat. No. 4,805,680 was granted to M. Ueno for a card case with a magnifying glass, the card case being composed of an outer sheet as well as an inner sheet and the three edges of both the inner as well as the outer sheet are securely attached such as by adhesive, sewing and the like. In 1995, U.S. Pat. No. 5,471,347 was granted to A. J. Galiani for a lens magnification system for use with booklets to magnify printed matter on selected pages for reading. Moreover, in 1999, the present inventor was granted two U.S. Patents, namely, U.S. Pat. No. 5,986,823, issued Nov. 16, 1999, and U.S. Pat. No. 5,999,336, issued Dec. 7, 1999.

In U.S. Pat. No. 5,986,823, the present inventor disclosed a fresnel magnifying lens for forming a hand-held, pocket-sized hybrid assembly of the lens and another object or objects. The fresnel magnifying lens is provided with a hole for use with a fastener to detachably or permanently couple the lens to another object such as a credit card, debit card, smart card, telecards, pocket calendars, magnetic note holders, etc., in a manner which allows a selective magnifying hand-held viewing, through the lens, of both that other object, as well as other, different objects. In. U.S. Pat. No. 5,999,336, entitled, *"Fresnel Magnifying Lens Cardholder,"* the present inventor disclosed a credit card holder dimensioned to fit standardized cards and consisting, basically, of a back plate made, for example, by injection molding with two parallel J-shaped tracks to which a fresnel lens is attached to form a magnifying lens credit cardholder.

SUMMARY OF THE INVENTION

Conventionally, consistent with the above-named prior disclosures, the fresnel magnifying window is a built-in window in the credit card itself, namely, it is built into a card that serves dual functions. An example of this is given with regard to the above-named three U.S. patents issued to Finkelstein et al. In contrast, the present invention is not an integral part of any such standardized card. The present invention involves a completely different objective than that disclosed by Finkelstein et al. Consequently, those requirements that restrict and regulate the position and size of the lens, data and graphics, in laying out one's financial record, on the card are completely irrelevant to the present invention.

The magnifying lens cardholder according to the present invention is completely detachable from the card to which it is attached. The lens is not on the card; therefore, it cannot interfere with the built-in functions of any standardized card such as a credit card, debit card, nor can it interfere with the features on a smartcard (which contains an IC chip). Incidentally, the present invention is inclusive of attributes associated with the present inventor's fresnel magnifying lens cardholder with regard to his prior U.S. Pat. No. 5,999,336, the entire disclosure of which is hereby incorporated by reference. However, as will be shown herein, the present invention contains a significant patentable improvement thereover. Since the present invention is directed to a clear and patentable improvement over this inventor's earlier cardholder version according to U.S. Pat. No. 5,999,336, the following discussion which compares many of the attributes of a cardholder according to the present invention with that of the inventor's prior patent is being provided.

It is an objective of the present invention to produce a thin cardholder as well as a thin magnifying cardholder to protect the magnetic stripe and/or IC chip of a standardized card carried by a person such as credit cards/debit cards (including smart cards) and the like. The thin cardholder/thin magnifying cardholder with the standardized card(s) thereon is able to fit easily into the card compartments of an ordinary wallet or a purse without adding much bulk to it. The thin magnifying cardholder may also be referred to as a thin cardholder shaped magnifier.

Presently, the inventor has taken a different approach from that taken with regard to his prior patent (Yang, Jr. '336). Specifically, in Yang, Jr., '336, the fresnel magnifying lens is composed of a base plate with parallel J-shaped tracks used to hold and release a credit card while also shielding and keeping the magnetic stripe or IC chip on the card from damage, which attributes are also associated with the cardholder of the present invention. In Yang, Jr., '336, the base plate was also a platform for attaching a magnifying fresnel lens. That is, the cardholder according to Yang, Jr., '336, the entire contents of which are incorporated herein by reference, requires at least two distinct components, namely, (1) a base plate containing opposing parallel J-shaped tracks that enable it to hold a standardized card such as a credit/debit card and the like, protect the magnetic stripe and also serving as a platform to host the magnifying lens, and (2) a fresnel lens that is attached to the base plate for magnifying objects. On the other hand, the new cardholder is made from a thin clear (transparent) material that is used for forming a fresnel magnifying lens. That is, according to the inventor's present improvements to his earlier cardholder, the separate and substantially thicker back plate required in his earlier version is eliminated thereby making it possible for the new, improved cardholder to be substantially thinner and thereby to more easily fit into the card compartments of the average size wallet or purse.

In accordance with the present invention, the magnifier such as the fresnel lens magnifier is directly formed onto a sheet of clear (i.e., optically transparent) film of thermoplastic material (e.g., polyvinyl chloride [PVC], polycarbonate, polyester, and the like). This one-piece clear film or plastic sheet constitutes the entirety of the component parts of the cardholder. This greatly reduces the cardholders dimensions, especially in terms of its thickness since it is solely formed from material used to make the fresnel lens magnifier, thereby making it more attractive to the average credit card users.

As mentioned above, the invention according to Yang, Jr., '336 requires at least two component parts to form the credit card holder, namely, a backplate and a fresnel lens. On the other hand, the present improvements call for a scheme which requires only one component, namely, a clear film or plastic sheet made of material for forming the fresnel lens. Also, since the backplate is formed by injection molding process, according to an example preferred scheme of the Yang, Jr., '336 patent, the manufactured credit card holder, according to Yang, Jr., '336, is thereby destined to be thicker in all directions. On the other hand, due to such differences as that mentioned above, the process or technique involved in the manufacture of the inventor's present, new cardholder version leads to a number of advantages as well as improvements such as discussed below, although not limited thereto.

(1) The present invention does not require the formation of a base plate for attaching the fresnel lens. There is, therefore, a clear reduction in component costs. This is mainly because the production costs associated with producing a backplate mold via injection molding is several times greater than that for making the fresnel lens. (2) Assembling of the cardholder or manufacturing process according to the present invention is techniquely simpler. This is because since the improved cardholder does not require an additional component such as a base plate, there are significant savings in both time and labor costs. This will be more clearly understood later in the Specification in connection with the discussion of example manufacturing techniques involved in the production of a cardholder according to the present invention. (3) The one-piece construction of a cardholder according to the present invention produces a more durable/resilient cardholder especially since the magnifier lens cannot be separated from the cardholder material during the manufacture thereof and, also subsequent to its production, even during times when it is being used by a person. This leads to a significant lowering of quality control costs in the manufacture thereof as well as improved yield and, moreover, leads to increased customer satisfaction.

The present invention is directed to the cardholder device itself as well as to the technique involved in its manufacture. A brief summary of a number of aspects directed to the present invention are described below.

With regard to the cardholder, there is included a one-piece plastic piece forming a magnifying lens configured as a rectangle-shaped cardholder with dimensions approximating a standardized card carried by a person, the plastic material containing a viewing portion having fresnel contour lines and a pair of opposing parallel folded edges which form a pair of tracks of the cardholder for slipping on and off a standardized card. The fresnel contour lines may be stamped on either side of the viewing portion of the cardholder. The construction of the cardholder with the pair of folded edges which form the tracks is such that the standardized card, when inserted through the tracks, is held snuggly by the cardholder irrespective of the direction the cardholder is facing. Incidentally, the thin one-piece plastic piece of the type usable in forming a magnifying lens such as a fresnel lens can be used, also, to form a rectangle-shaped cardholder which is not used as a magnifier.

As to the manufacture of the cardholder, the following brief aspects directed thereto are provided. The method of making a cardholder shaped magnifying lens includes providing a one-piece clear plastic sheet with fresnel contour lines at a portion thereof; die-cutting the one-piece plastic sheet to form a rectangle-shape of a standardized card with tab-like extensions provided at a pair of opposing edges of the rectangle; and forming a pair of opposing folded edges of the rectangle-shaped plastic sheet by heating and bending the softened tab-like extensions thereof, the folded edges forming a pair of tracks on the same side of the cardholder. If the cardholder is not to be used as a magnifier, then it need not contain a magnifying window.

In the manufacturing technique of the cardholder shaped magnifying lens, the technique, optionally, may also include, prior to the forming of the folded edges, the placing of a mask over the fresnel contour lines of a size corresponding to the desired fresnel lens viewing window and then coating the remaining portion on the same side of the one-piece clear plastic sheet as that to which the mask is placed to achieve a durable, opaque finish. The coated side may be on the same side or on the side opposite of that where the tracks are to be formed.

Example details regarding the above are discussed more extensively in connection with the detailed example embodiments described in the Specification in conjunction with the related illustrations directed thereto.

BRIEF DESCRIPTION OF THE DRAWINGS

The above set forth and other featured aspects of the invention are made more apparent in the ensuing detailed description of the invention when read in conjunction with the related examples described and illustrated in the accompanying drawing, wherein:

FIG. 6A shows a production flow chart involving the process of manufacture of a cardholder according to the present invention;

FIGS. 6B and 6C are two examples of modifications associated with the process shown by the flow chart in FIG. 6A of the drawings in connection with the manufacture of a cardholder according to the present invention.

DESCRIPTION OF EXAMPLE PREFERRED EMBODIMENTS

Figure 1:
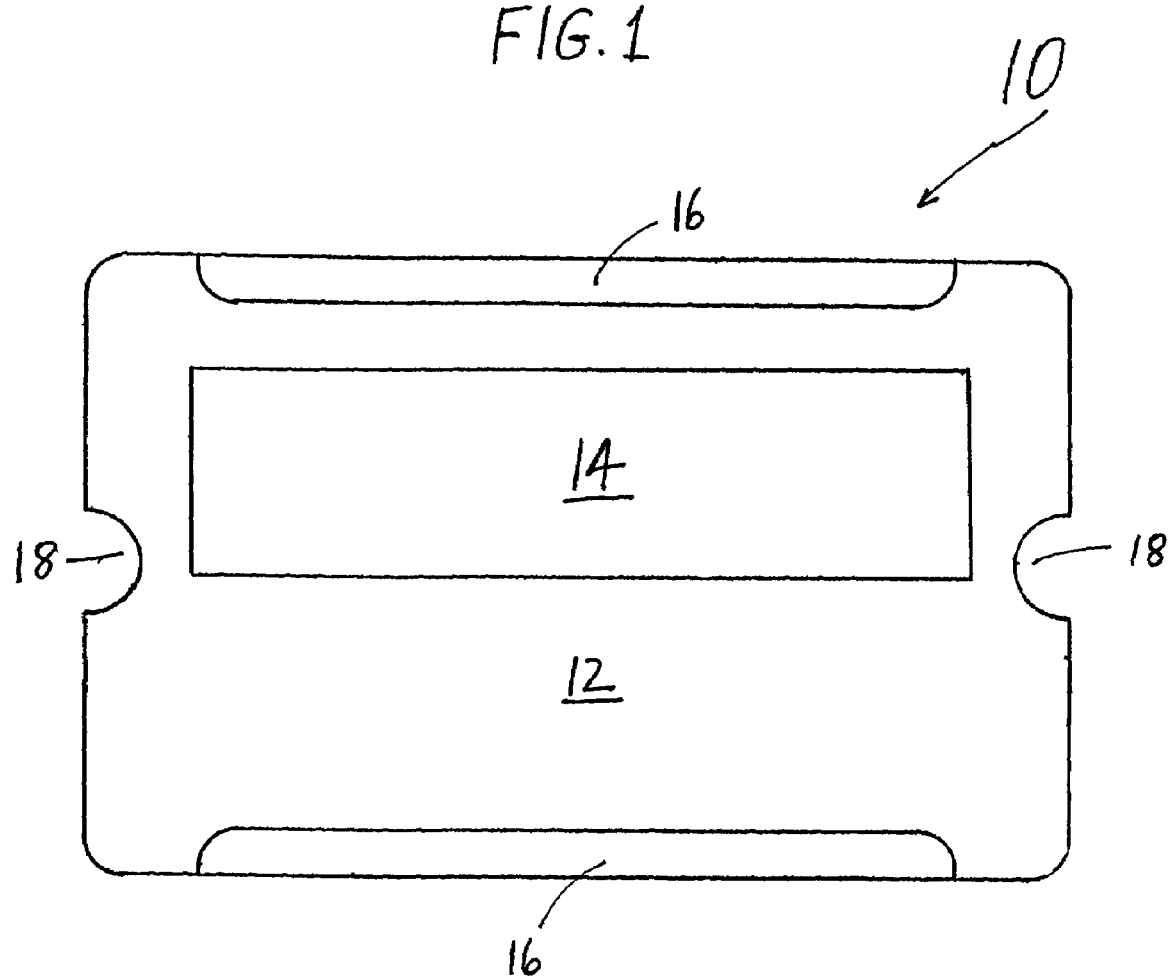
FIG. 1 is a top front view of a cardholder according to one example embodiment of the present invention.

FIG. 1 of the drawings is illustrative of an example embodiment of a cardholder/cardholder shaped magnifier according to the present invention. In the FIG. 1 example embodiment, the cardholder shaped magnifier 10 can be referred to as a cardholder shaped fresnel magnifying lens since it is made of the same material as that used for forming the viewing portion which has the fresnel contour lines. Specifically, the cardholder 10, which is for holding a standardized card as well as for use as a magnifying lens, is made from a one-piece of transparent sheet made of thermoplastic material such as a polyvinyl chloride (PVC), polycarbonate, polyester, and the like, although not limited thereto. The cardholder 10 is an integral part of the fresnel lens and the lens, in turn, is an integral part of the cardholder.

With regard to the FIG. 1 example embodiment of the present invention, the one piece cardholder shaped magnifying fresnel lens 10 contains a blank base portion 12, a viewing portion 14 covering a rectangle-shaped area extending parallelly to the tracks (the size, shape and position of the viewing portion being determined on the basis of the level of viewing desired, although limited by the surface dimensions of the cardholder), and a pair of opposing folded edges 16 which are constituted, in this example, by tab-like extensions located along the pair of longitudinal edges of the rectangle (although not limited thereto). (In this description, the folded edges and the tracks are interchangeably used.) The tracks formed are J-shaped, in this example, for slipping on and off a standardized card such as a credit card or debit card which may contain a magnetic stripe or an IC chip such as in connection with smartcards and the like. The J-shaped tracks shown in FIG. 1 are facing each other and are extended, in this example, along the opposing longitudinal edges of the blank base portion 12 of the one-piece cardholder 10. The cardholder may also contain a cut-a-way at each or both of the other pair of opposing edges of the rectangle so as to enable easy removal of a card from the cardholder (in this example two semicircular cut-a-ways 18 are provided on the pair of shorter edges of the rectangle). To piggyback the cardholder 10 onto a standardized card, an individual merely slips the holder onto a card via the pair of tracks.

Since cardholder 10 is constituted by a one-piece transparent sheet made of similar type of thermoplastic material as that employed in the making of the fresnel magnifying lens, the cardholder itself becomes an integral part of the fresnel lens and the lens, in turn, also becomes an integral part of the cardholder. The new cardholder, also, is simpler to make in that it eliminates the need of an additional one or two other components, especially the need for a separate backplate which was required with regard to the old cardholder version in Yang, Jr., '336. Also, there is a significant savings in labor, time as well as cost involved in the manufacture thereof. Moreover, since the cardholder is made of the same thin thermoplastic material as that employed for making the fresnel magnifying lens, it is possible for the new holder, with or without a magnifying portion 14, to be substantially thinner which leads to better fitting of the cardholder into the card compartments of average sized wallets or purses. Additionally, there is improved durability in the cardholder since the magnifier lens cannot be separated from the cardholder since it is an integral part of the cardholder and the cardholder is an integral part of the fresnel lens window as a result of the cardholder being constructed of a one-piece sheet of material. These represent some of the main advantages and improvements of a construction scheme such as that featured with regard to the example embodiment illustrations in FIG. 1 of the drawings, although these benefits should not be considered as being limited thereto.

The one-piece cardholder according to the present invention such as shown by the example in FIG. 1, may be constituted by a one-piece plastic material which is also coated on either side thereof, except for the viewing portion of the cardholder, with an opaque finish (e.g., a painted finish). This is considered an optional feature which may be employed in terms of practicalities including to highlight the location of the fresnel magnifying lens viewing portion as well as to define the blank base portion which defines the area thereof where an individual may make finger contact, although not limited thereto. Preferably, the opaque finish should be provided on an outer side (i.e., outer surface side) of the cardholder, opposite the inner side thereof (i.e., inner surface side) where the tracks are provided. The reason for this is so as to maintain a smoother surface on the inner side of the cardholder for easy slipping on and off of the card on the cardholder.

Figure 2:
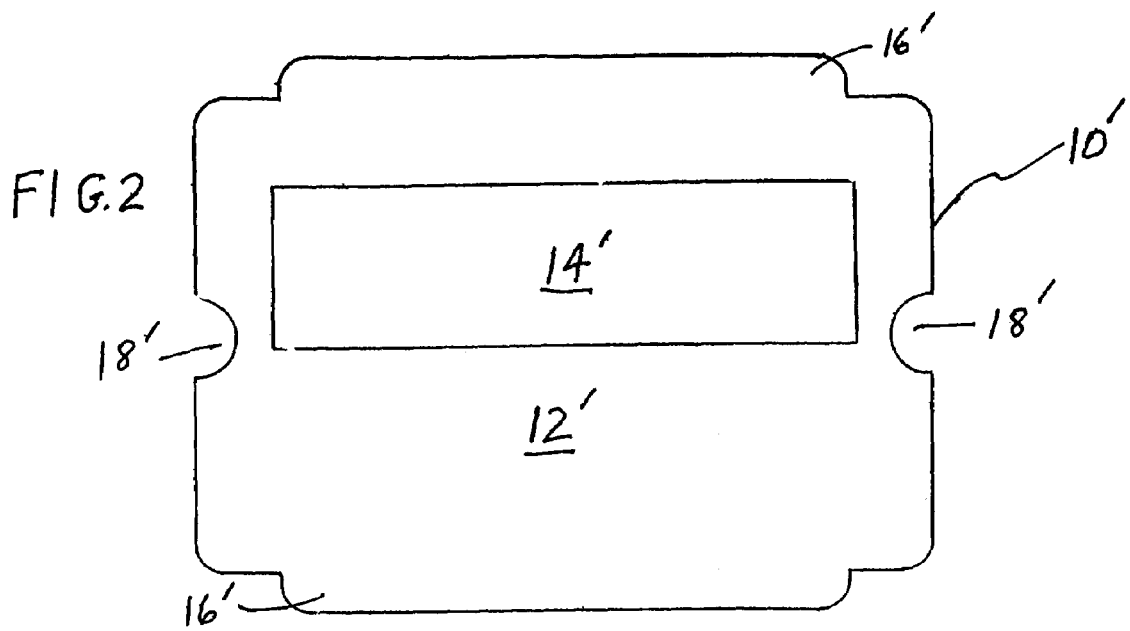
FIGS. 2–5 are top front views of different phases involved in the manufacture of a cardholder according to the example embodiment shown in FIG. 1.
Figure 3:
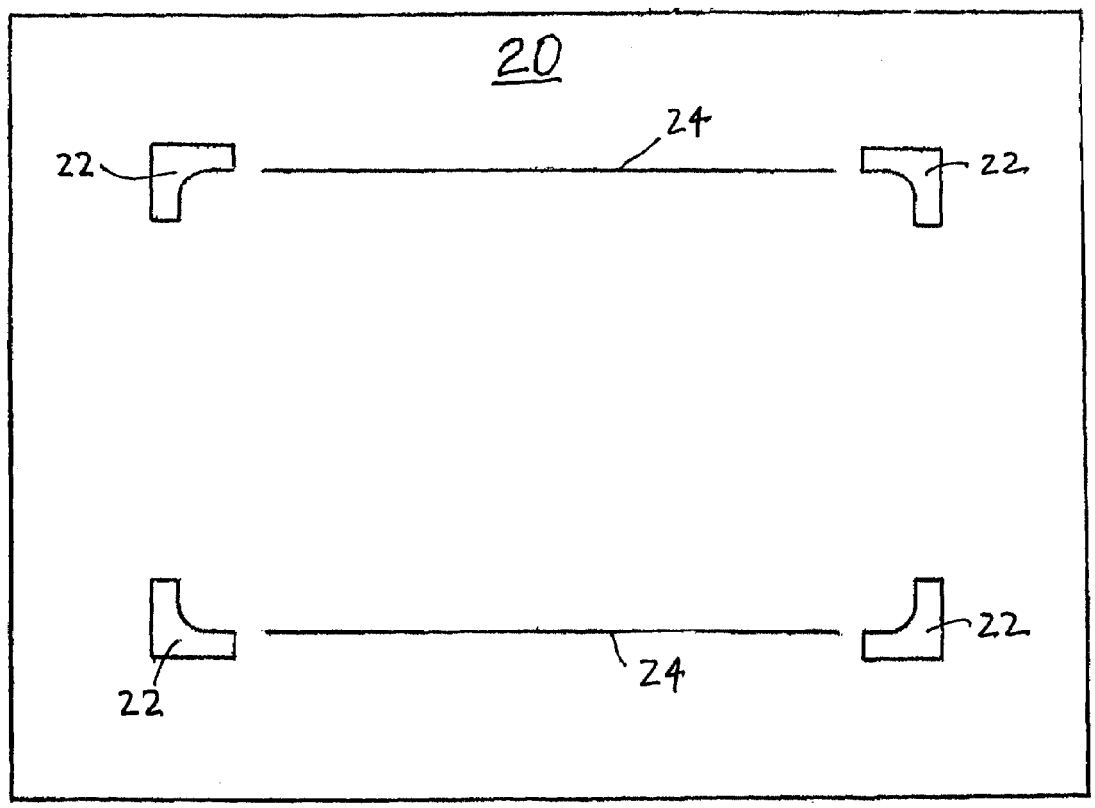
Figure 4:
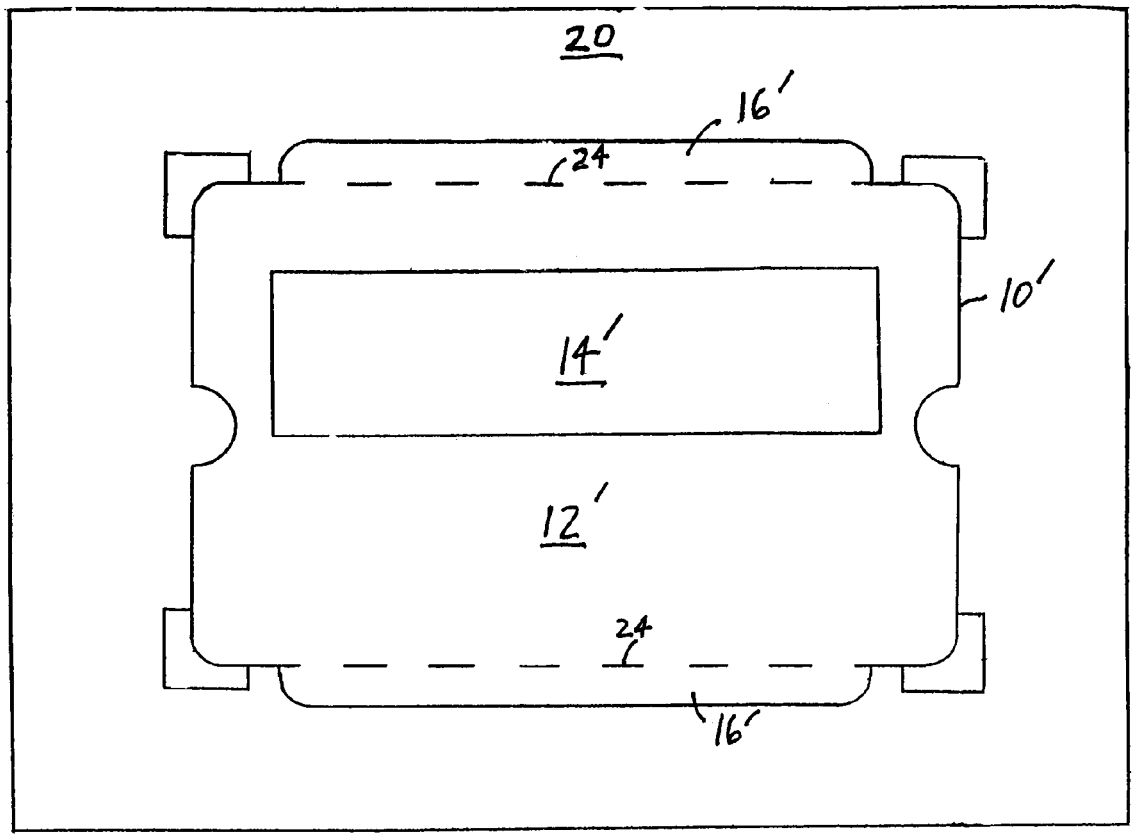
Figure 5:
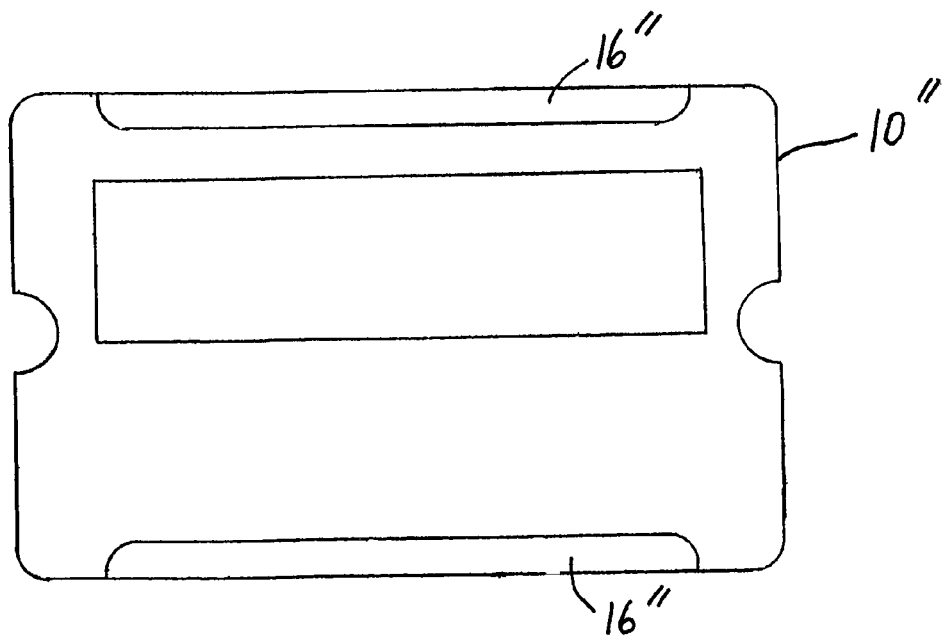

The benefits (advantages and structural improvements) that are realizable by a technique directed to a cardholder of the present invention will become more clear in connection with the manufacturing technique employed with regard to the example embodiment shown in FIG. 1 of the drawings, although not limited thereto. FIGS. 2–4 are directed to the particular phases in the manufacturing process of the cardholder shaped fresnel magnifying lens of the present invention such as is applicable to the example FIG. 1 embodiment. FIG. 6A shows in block diagram a summary of the different phases in the manufacture of the cardholder related to FIGS. 2–5 and FIGS. 6B and 6C are alternative variations of that shown in FIG. 6A.

The method of making (manufacture) of the cardholder shaped magnifying lens such as with regard to that shown in FIG. 1, although not limited thereto, calls for providing a one-piece clear plastic sheet with fresnel contour lines formed at a portion thereof. Since the making of a thermoplastic fresnel lens per se is well known to the lens making and plastic industries, no attempt will be made to describe the making of such a lens. As described earlier in the Specification, the one-piece clear plastic sheet may be constituted of thermoplastic material such as PVC, polycarbonate, polyester or any other similar type material. The fresnel magnifying lens is formed in the thermo-plastic material by, for example, stamping the desired fresnel contour lines onto a surface (side) of the material. Alternatively, the thermo-plastic sheet may be pressed onto a fresnel lens to form a fresnel lens pattern (e.g., contour lines for magnification) on the thermo-plastic sheet using heat pressing. The clear plastic sheet with the fresnel contour lines at a portion thereof is then modified in shape, for example, is die-cut into a shape such as a rectangle shape of a standardized card size and with tab-like extensions provided at a pair of opposing edges of the rectangle such as along the elongated edges of the rectangle (although not limited thereto). The die-cut one-piece plastic sheet having a rectangle shape which is provided with tab-like extensions along the elongated edges (longitudinal edges) is shown in FIG. 2 of the drawings. A further aspect of the die-cutting phase in the manufacture of the cardholder, optionally, may include also the curving of all of the corners of the rectangle as well as the corners of the tab-like extensions thereof, as shown in FIG. 2. Also optionally, the shape modification, for example, the die-cutting phase, may include cutting away a portion at one or both of the other pair of opposing edges of the rectangle such as shown by reference 18' in FIG. 2 of the drawings. The one-piece clear thermo-plastic sheet that is die-cut, according to this method, as well as the blank base portion and the portion stamped with the fresnel contour lines as well as the curved tab-like extensions of the rectangle shape are shown by reference numerals 10', 12', 14' and 16', respectively, in FIG. 2.

Following this phase, the method also calls for forming a pair of opposing parallel folded edges of the die-cut rectangle-shaped plastic sheet by a heating and bending process which permits the softened tab-like extensions thereof to be folded so as to form a pair of tracks on the same side of the cardholder. This involves placing the die-cut thermoplastic lens securely over a heating table 20 which has two parallel and embedded electric heating elements 24 appropriately distanced from each other and each having a length corresponding to the length of the tab-like extensions to be folded. In that regard, the die-cut rectangle-shaped one-piece thermoplastic sheet is placed securely over the heating table and a controlled amount of heat is delivered to the lens material (i.e., the thermo-plastic sheet) via the heating elements. This phase in the method of manufacture can be seen with regard to FIGS. 2 and 3 of the drawings in which the die-cut plastic sheet is rested on the heating table and bounded by the four curved corner holders 22 which hold the die-cut lens sheet in place. As can be seen from FIG. 4, the heating elements 24 are situated approximately beneath the location of the longitudinal edges of the rectangle where the folding action of the tab-like extensions 16' are to take place. Once the thermo-plastic material is softened, the softened tab-like extensions are, for example, bent 180° to thereby form a pair of folded edges and realize the formation on the same side of the rectangle two opposing, parallel J-shaped tracks 16" as can be seen from FIG. 5 of the drawings. A summary of the phases involved in the making of the cardholder shaped fresnel magnifying lens, according to the present invention, is shown by the flow-diagram shown in FIG. 6A of the drawings, which relates to that described with regard to FIGS. 2–5 of the drawings.

The method of making the cardholder, optionally, may also include the forming of an opaque finish on a side of the one-piece clear thermoplastic sheet, prior to the forming of the folded edges. This can be achieved, for example, through simply placing a mask over the fresnel contour lines of a size corresponding to a fresnel lens viewing window and then coating the remaining portion on the same side of the one-piece clear plastic sheet as that to which the mask is placed to achieve a durable, opaque finish. The coated side may be on the same side or on the side opposite of that where the tracks of the cardholder are to be formed. The coating of a side of the one-piece plastic sheet with an opaque finish may be effected at a phase of the method of making between that of the die-cutting of the one-piece plastic sheet and the forming of the folded edges. This is shown in FIG. 6B of the drawings. Alternatively, the coating phase can be employed at a phase subsequently to the forming of the fresnel contour lines but before the die-cutting of the one-piece plastic sheet, such as shown in FIG. 6C of the drawings.

As a further modification, the pressing of the fresnel contour lines can be effected subsequently to the coating phase such as by first placing a mask over a portion of the clear plastic sheet where a fresnel window is to be formed and painting the remainder of the plastic sheet so as to achieve an opaque finish at one side thereof and, subsequently, pressing a fresnel lens onto the sheet to form the contour lines at the location of the window.

This concludes the description of the example embodiments. Although the present invention has been described with reference to a number of illustrations directed thereto, it should be understood that numerous other modifications and embodiments can be devised by those skilled in the art that will fall within the spirit and scope of the principles of this invention. For example, since the cardholder is rectangle-shaped, both pairs of opposing edges can be used such as to form two-pairs of tracks, one pair of tracks being folded to hold one or several standardized cards over one side of the cardholder and the other pair of tracks being folded to hold one or several standardized cards over the opposing side of the cardholder. Further, the cardholder may also be implemented to have three such tracks to hold one or several standardized cards over one side of the cardholder. Optionally, also an opaque finish may be effected on either or on both sides of the one-piece plastic sheet in the manufacture of the cardholder. Other reasonable variations and modifications are possible in the component portions of the one-piece cardholder that are within the scope of the foregoing disclosure, the drawings and the appended claims without departing from the spirit of the invention. In addition to variations and modifications thereof, alternative uses will also be apparent to those skilled in the art.

What is claimed is:

1. A method of making a one-piece pocket size cardholder shaped fresnel magnifying lens comprising:
    (a) forming a one-piece clear plastic sheet into a rectangle shape of a standardized card with tab-like extensions of the plastic sheet provided at a pair of opposing edges of the rectangle,
    wherein the one-piece clear plastic sheet is further provided with fresnel contour lines; and
    (b) forming a pair of opposing parallel folded edges of the rectangle-shaped plastic sheet by heating and bending the heat softened tab-like extensions thereof, the folded edges forming a pair of tracks on a same side of the rectangle-shaped plastic sheet, and the pair of tracks enabling the slipping on and off one or more of said standardized card.

2. The method of making a one-piece pocket size cardholder shaped fresnel magnifying lens according to claim 1, wherein the forming of the plastic sheet with the fresnel contour lines into the rectangle shape of a standardized card further includes curving each of the corners of the rectangle and of the tab-like extensions thereof.

3. The method of making a one-piece pocket size cardholder shaped fresnel magnifying lens according to claim 2, wherein the forming of the plastic sheet with the fresnel contour lines into the rectangle shape of a standardized card further includes cutting away a portion at an edge thereof other than at the location of the tab extensions of the rectangle.

4. The method of making a one-piece pocket size cardholder shaped fresnel magnifying lens according to claim 1, wherein prior to the forming of the folded edges, there is further comprised:
    placing a mask over the fresnel contour lines of a size corresponding to a fresnel lens viewing window and then coating the remaining portion of that side of the one-piece clear plastic sheet to achieve a durable, opaque finish, the coated side being at either side of the one-piece plastic sheet.

5. The method of making a one-piece pocket size cardholder shaped fresnel magnifying lens according to claim 4, wherein the coating of a side of the one-piece plastic sheet with an opaque finish is effected at a phase of the method between that of forming the rectangle shape with tab-like extensions and the forming of the folded edges.

6. The method of making a one-piece pocket size cardholder shaped fresnel magnifying lens according to claim 4, wherein the coating of a side of the one-piece plastic sheet with an opaque finish is effected at a phase or the method subsequently to forming the fresnel contour lines at a portion of the one-piece clear plastic sheet and before the forming of the rectangle shape with tab-like extensions.

7. A method of making a one-piece pocket size cardholder shaped fresnel magnifying lens comprising:

(a) forming a one-piece clear plastic sheet into a rectangle shape of a standardized card with tab-like extensions of the plastic sheet provided at a pair of opposing edges of the rectangle, wherein the one-piece clear plastic sheet is further provided with fresnel contour lines; and (b) forming a pair of opposing parallel folded edges of the rectangle-shaped plastic sheet by applying controlled heating to the tab-like extensions thereof and bending the heat softened tab-like extensions, the folded edges forming a pair of tracks on a same side of the cardholder rectangle-shaped plastic sheet, and the pair of tracks enabling the slipping on and off of one or more said standardized card, wherein the controlled heating includes placing securely the rectangle-shaped one-piece plastic sheet over a table having at least a pair of properly spaced heating elements embedded in the table so that a controlled amount of heat can be delivered to the entirety of tab-like extensions to cause them to be bendable to about 180°.

8. The method of making a one-piece pocket size cardholder shaped fresnel magnifying lens according to claim 7, wherein prior to the forming of the folded edges, there is further comprised:

placing a mask over the fresnel contour lines of a size corresponding to a fresnel lens viewing window and then coating the remaining portion of that side of the one-piece clear plastic sheet to achieve a durable, opaque finish, the coated side being at either side of the one-piece plastic sheet.

9. The method of making a one-piece pocket size cardholder shaped fresnel magnifying lens according to claim 8, wherein the coating of a side of the one-piece plastic sheet with an opaque finish is effected at a phase of the method between that of forming the rectangle shape with tab-like extensions and the forming of the folded edges.

10. The method of making a one-piece pocket size cardholder shaped fresnel magnifying lens according to claim 8, wherein the coating of a side of the one-piece plastic sheet with an opaque finish is effected at a phase of the method subsequently to forming the fresnel contour lines and before the forming of the rectangle shape with tab-like extensions.

\* \* \* \* \*